US010338738B2

(12) United States Patent
Sun et al.

(10) Patent No.: US 10,338,738 B2
(45) Date of Patent: Jul. 2, 2019

(54) TOUCH DISPLAY DEVICE AND METHOD FOR DRIVING THE SAME

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventors: Ying Sun, Xiamen (CN); Yumin Xu, Xiamen (CN)

(73) Assignees: XIAMEN TIANMA MICRO-ELECTRONICS CO., LTD., Xiamen; TIANMA MICRO-ELECTRONICS CO., LTD., Shenzhen (CN)

( * ) Notice: Subject to any disclaimer, the term of this patent is extended or adjusted under 35 U.S.C. 154(b) by 309 days.

(21) Appl. No.: 15/242,898

(22) Filed: Aug. 22, 2016

(65) Prior Publication Data

US 2017/0308237 A1   Oct. 26, 2017

(30) Foreign Application Priority Data

Apr. 20, 2016   (CN) .......................... 2016 1 0246772

(51) Int. Cl.
*G06F 3/041* (2006.01)
*G06F 3/044* (2006.01)
(52) U.S. Cl.
CPC ............ *G06F 3/0418* (2013.01); *G06F 3/044* (2013.01); *G06F 3/0412* (2013.01);
(Continued)
(58) Field of Classification Search
CPC .... G06F 3/0418; G06F 3/0412; G06F 3/0414; G06F 3/044; G06F 2203/04105; G06F 2203/04111
See application file for complete search history.

(56) References Cited

U.S. PATENT DOCUMENTS 9,024,913 B1 * 5/2015 Jung ...................... G06F 3/044
                                                                345/174
9,690,408 B1 * 6/2017 Krah ..................... G06F 3/0412
(Continued)

FOREIGN PATENT DOCUMENTS

CN          105068695 A       11/2015

OTHER PUBLICATIONS

CN First Office Action dated Apr. 2, 2018 in the corresponding Chinese application (application No. 201610246772.2).

*Primary Examiner* — Benyam Ketema
(74) *Attorney, Agent, or Firm* — Kilpatrick Townsend & Stockton LLP

(57) ABSTRACT

The present disclosure provides a touch display device and a method for driving the touch display device. The touch display device includes an array substrate and a color film substrate arranged opposite to the array substrate; a touch electrode array disposed on the array substrate, and a plurality of touch sensing electrodes arranged along a first direction and disposed on the color film substrate. The touch electrode array includes M×N touch electrodes. The touch electrodes are insulated from each other. The touch sensing electrodes extend along a second direction perpendicular to the first direction, and the touch sensing electrodes are insulated from each other. An orthographic projection of each of the touch electrodes to a plane where the touch sensing electrodes are located at least partially overlaps with one of the touch sensing electrodes.

15 Claims, 7 Drawing Sheets

(52) U.S. Cl.
CPC .......... *G06F 3/0414* (2013.01); *G06F 3/0416* (2013.01); *G06F 2203/04103* (2013.01); *G06F 2203/04105* (2013.01); *G06F 2203/04111* (2013.01)

(56) References Cited

U.S. PATENT DOCUMENTS

| | | | |
|---|---|---|---|
| 9,733,756 B2* | 8/2017 | Shepelev | G06F 3/0416 |
| 9,733,760 B2* | 8/2017 | Kim | G06F 3/0416 |
| 9,996,175 B2* | 6/2018 | Hotelling | G06F 1/3218 |
| 2011/0128254 A1* | 6/2011 | Teranishi | G06F 3/044 345/174 |
| 2012/0162090 A1* | 6/2012 | Chang | G06F 3/0412 345/173 |
| 2014/0118277 A1* | 5/2014 | Kim | G06F 3/044 345/173 |
| 2014/0132534 A1* | 5/2014 | Kim | G06F 3/0412 345/173 |
| 2014/0240279 A1* | 8/2014 | Hwang | G06F 3/0412 345/174 |
| 2016/0092010 A1* | 3/2016 | Agarwal | G06F 3/0412 345/173 |
| 2016/0092015 A1* | 3/2016 | Al-Dahle | G06F 3/044 345/174 |
| 2017/0038879 A1* | 2/2017 | Hsiao | G06F 3/0414 |
| 2017/0068376 A1* | 3/2017 | Kim | G06F 3/0416 |

* cited by examiner

TOUCH DISPLAY DEVICE AND METHOD FOR DRIVING THE SAME

TECHNICAL FIELD

The present disclosure generally relates to the field of display technology, and in particular, to a touch display device and a method for driving the device.

BACKGROUND

A capacitive touch display screen may be a surface-capacitive touch screen or a projective touch screen based on the touch principle. Moreover, the projective touch screen may be in turn divided into a self-capacitive touch screen or a mutually-capacitive touch screen.

FIG. 1 illustrates a schematic structure of a prior art mutually-capacitive touch screen.

The mutually-capacitive touch screen in FIG. 1 includes an array substrate 110 and a color film substrate 120 disposed opposite to the array substrate 110.

A touch transmitting electrode array is formed on the array substrate 110, and includes a plurality of touch transmitting electrodes 111. The touch transmitting electrodes 111 are strip-shaped electrodes, and the touch transmitting electrodes 111 in the touch transmitting electrode array are arranged parallel to each other. Each of the touch transmitting electrodes 111 is connected to an integrated circuit chip 113 via a touch scanning signal line 112, so as to receive a touch scanning signal sent by the integrated circuit chip 113.

A touch sensing electrode array is formed on the color film substrate 120, and includes a plurality of touch sensing electrodes 121. Similar to the touch transmitting electrodes 111, the touch sensing electrodes 121 are also strip-shaped electrodes. The extension direction of the touch sensing electrodes 121 intersects with that of the touch transmitting electrodes 111. The touch transmitting electrodes 121 in the touch sensing electrode array are arranged parallel to each other. Each of the touch sensing electrodes 121 is connected to the integrated circuit chip 113 via a touch sensing signal line 122 and an FPC (flexible printed circuit) 123, so as to send touch sensing signals to the integrated circuit chip 113.

However, the mutually-capacitive touch screen in the prior art shown in FIG. 1 cannot implement the detection on the external pressure. Specifically, when a pressure is applied to the touch screen shown in FIG. 1, it is unable to detect the location of applied pressure or to detect the magnitude of the applied pressure.

SUMMARY

In view of the above-mentioned drawbacks in the prior art, it is desirous to provide a touch display device and a method for driving the touch display device, so as to solve the technical problem(s) in the prior art.

In the first aspect, an embodiment of the present disclosure provides a touch display device, comprising an array substrate and a color film substrate arranged opposite to the array substrate; a touch electrode array disposed on the array substrate; and a plurality of touch sensing electrodes arranged along a first direction and disposed on the color film substrate. The touch electrode array includes M×N touch electrodes. The touch electrodes are insulated from each other, and the touch electrodes are configured to provide a common voltage signal during a displaying period, to provide a touch scanning signal during a touch scanning period, and to provide a pressure scanning signal and receive pressure sensing signals during a pressure detecting period. The touch sensing electrodes extend along a second direction perpendicular to the first direction, and the touch sensing electrodes are insulated from each other and are configured to receive touch sensing signals during the touch scanning period. An orthographic projection of each of the touch electrodes to a plane where the touch sensing electrodes are located at least partially overlaps with one of the touch sensing electrodes.

In the second aspect, the present disclosure further provides a method for driving a touch display device according to any one of claims 1-12. Each frame period comprises a displaying period, a touch scanning period, and a pressure detecting period. The method comprises: during the displaying period, the common voltage signal is provided by the integrated circuit to the touch electrodes, and the reference voltage signal is provided by the integrated circuit to the touch sensing electrodes. During the touch scanning period, the touch scanning signal is provided by the integrated circuit to the touch electrodes and the touch sensing signals is received by integrated circuit from all the touch sensing electrodes. During the pressure detecting period, the pressure scanning signal is provided by the integrated circuit to the touch electrodes and the reference voltage signal is provided by the integrated circuit to the touch sensing electrodes.

In accordance with the present disclosure, the touch electrodes in the touch electrode array arranged on the array substrate provided in various embodiments are capable of receiving pressure sensing signals during the pressure detecting period, thereby implementing the detection on the pressure applied position and the magnitude of the pressure, without needing an additional pressure detecting module.

BRIEF DESCRIPTION OF THE DRAWINGS

After reading the detailed description on the non-limiting embodiments with reference to the accompany drawings, other features, objectives, and advantages of the present disclosure will become more apparent.

DETAILED DESCRIPTION OF EMBODIMENTS

Figure 1:
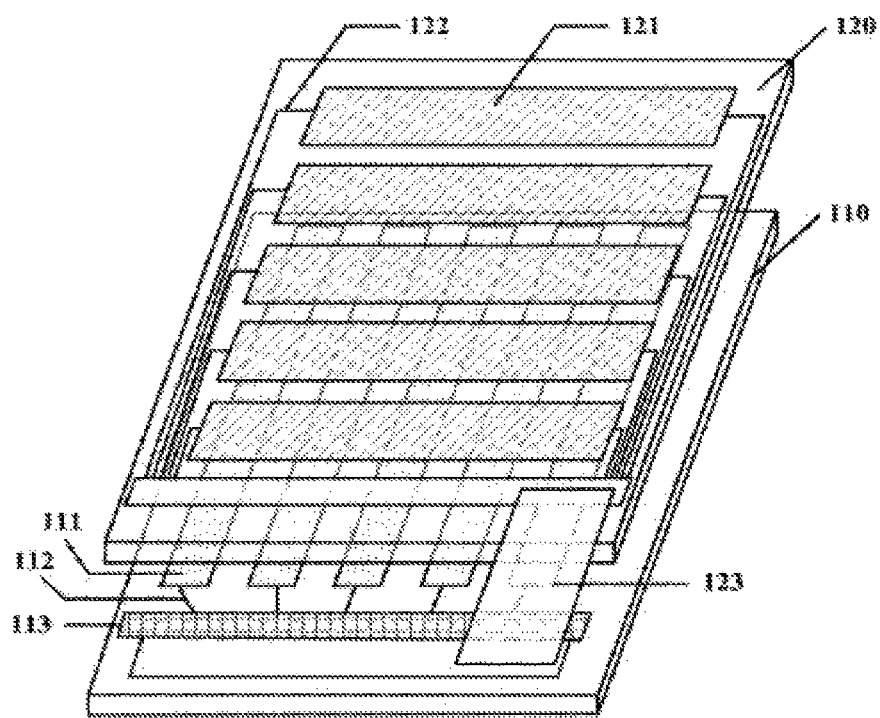
FIG. 1 shows a schematic structural view of a mutually-capacitive touch screen in the prior art.

Hereinafter, the embodiments of the present disclosure will be described in conjunction with the accompanying drawings. It should be understood that the specific embodiments are merely used for illustrating the invention, without making limitations thereto. Further, to facilitate description of the application, only portions related to the invention are shown in the drawings.

Moreover, the embodiments in the present disclosure, as well as the features in the embodiments, may be combined with each other if there is no conflict. Hereinafter, the present disclosure will be described in details according to the accompanying drawings in conjunction with the embodiments.

Figure 2:
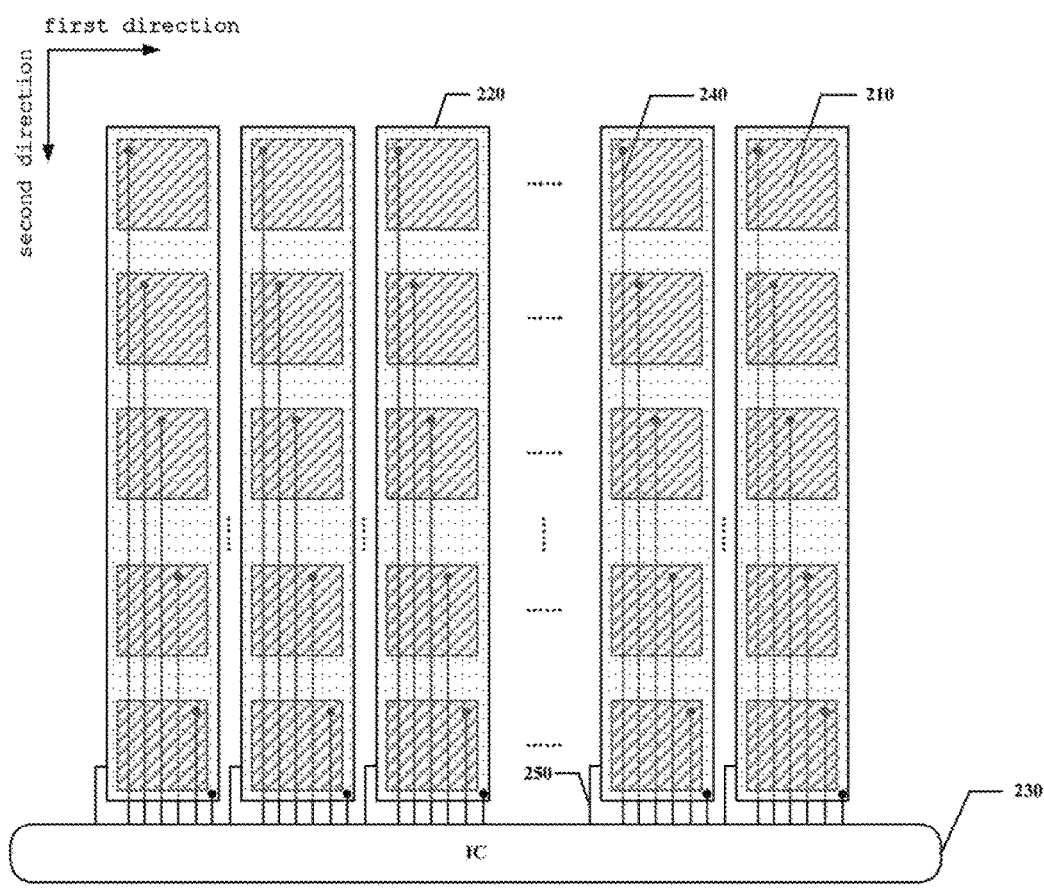
FIG. 2 shows a schematic structural view of a touch display device according to one embodiment of the present disclosure.

FIG. 2 illustrates a schematic structure of a touch display device according to one embodiment of the present disclosure.

In this embodiment, the touch display device includes an array substrate and a color film substrate disposed opposite to the array substrate.

As shown, a touch electrode array is disposed on the array substrate. The touch electrode array includes M×N touch electrodes 210. The touch electrodes 210 are insulated from each other. The touch electrodes 210 are configured to provide a common voltage signal during a displaying period, to provide a touch scanning signal during a touch scanning period, and to provide a pressure scanning signal and receive pressure sensing signals during a pressure detecting period.

As also shown, a plurality of touch sensing electrodes 220 arranged along a first direction are disposed on the color film substrate. The touch sensing electrodes extend along a second direction perpendicular to the first direction. The touch sensing electrodes are insulated from each other and are configured to receive touch sensing signals during the touch scanning period.

In this embodiment, the orthographic projection of each of the touch electrodes to the plane where the touch sensing electrodes are located at least partially overlaps with one of the touch sensing electrodes.

One skilled in the art will understand that the touch display device in this embodiment may further include other conventional structures, for example, a liquid crystal layer located between the array substrate and the color film substrate, and a pixel electrode disposed within each pixel region.

The touch electrodes 210 provide the common voltage signal during the displaying period, provide the touch scanning signal during the touch scanning period, and provide the pressure scanning signal and receive the pressure sensing signal during the pressure detecting period.

As a result, the touch electrodes 210 are used as a common electrode during the displaying period, and an electric field is generated from a provided common voltage and a data voltage applied to the pixel electrode, such that the liquid crystal molecules in the liquid crystal layer located between the array substrate and the color film substrate twist correspondingly, so as to display a corresponding image on the touch display device.

During the touch scanning period, the combination of the touch electrodes 210 and the touch sensing electrodes 220 forms a mutually-capacitive architecture in which the touch electrodes 210 provide the touch scanning signal, and the touch sensing electrodes 220 receive the touch sensing signals to obtain the coordinate value (i.e., an x-y coordinate) of the touch position of a finger (or another external force) on the touch display device in a coordinate plane parallel to the array substrate.

In addition, during the pressure sensing period, the touch electrodes 210 provide a pressure scanning signal. Since the orthographic projection of each of the touch electrodes 210 to the plane where the touch sensing electrodes 220 are located overlaps at least partially with one of the touch sensing electrodes 220, the touch electrode 210 and the at least partially overlapping touch sensing electrode 220 may form a capacitor. When a finger (or another external force) presses the touch display device, at the place where the finger presses, the pressure will cause the distance between the touch electrode 210 and the touch sensing electrode 220 at least partially overlapping with the orthographic projection of the touch electrode 210 to change, thereby leading to a change in the capacitance formed by the touch electrode 210 and the touch sensing electrode 220. The touch electrode 210 receive a pressure sensing signal representing the variation of the capacitance between the touch electrode 210 and the touch sensing electrode 220 to obtain the position and magnitude of the pressure applied by the finger (or another external force) to the touch display device.

Referring to FIG. 2, the touch display device of this embodiment further includes an integrated circuit 230 and a plurality of touch scanning signal line sets. Each of the touch scanning signal line sets includes at least one touch scanning signal line 240.

Each of the touch electrodes 210 is correspondingly connected to a first end of at least one touch scanning signal line 240, and a second end of each of the touch scanning signal lines 240 is connected to the integrated circuit 230. The first ends of the touch scanning signal lines 240 in the same touch scanning signal line set are correspondingly connected to the same touch electrode 210. That is, the at least one touch scanning signal line 240 electrically connected to the same touch electrode 210 is used as a touch scanning signal line set.

The integrated circuit 230 is configured to provide the common voltage signal to the touch electrodes 210 during the displaying period, to provide the touch scanning signal to the touch electrodes 210 during the touch scanning period, and to provide the pressure scanning signal to the touch electrodes 210 and receive the pressure sensing signals from the touch electrodes 210 during the pressure detecting period.

In some embodiments, each of the touch electrodes 210 may be disposed on the same layer as each of the touch scanning signal lines 240. For example, the touch electrodes 210 and the touch scanning signal lines 240 are formed on a transparent electrode layer in the same pattern process.

Alternatively, in some other embodiments, the touch electrodes 210 and the touch scanning signal lines 240 may be formed on different film layers, and the touch electrodes 210 are electrically connected to the corresponding touch scanning signal lines 240 via through holes, respectively.

The structure of the integrated circuit 230 in the touch display device in some embodiments will be further described with reference to FIG. 3.

Figure 3:
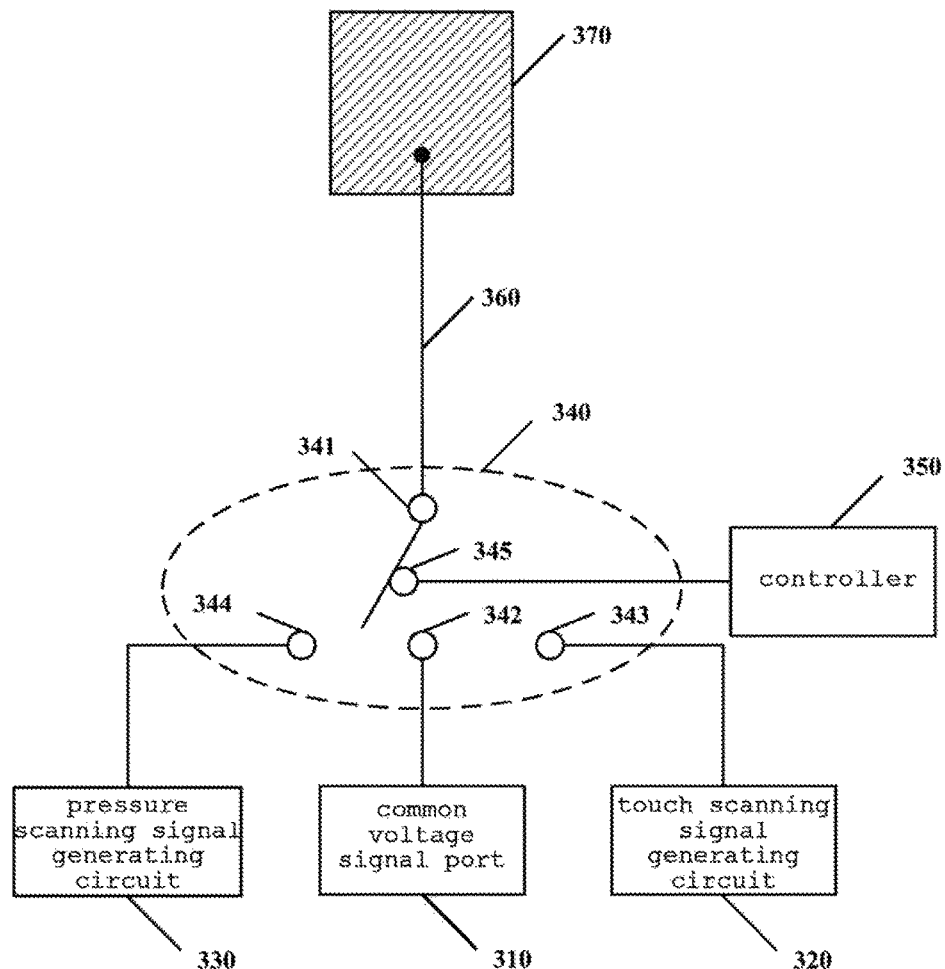
FIG. 3 shows a schematic structural view of an integrated circuit in the touch display device of the present disclosure.

Referring to FIG. 3, the integrated circuit 230 includes a common voltage signal port 310, a touch scanning signal generating circuit 320, a pressure scanning signal generating circuit 330, a plurality of switches 340, and a controller 350 for controlling the ON/OFF state of the plurality of switches.

Each of the switches 340 includes a first port 341, a second port 342, a third port 343, a fourth port 344, and a control port 345.

The first port 341 of each of the switches 340 is correspondingly connected to the second end of the respective touch signal line 360, the second port 342 of each of the switches 340 is correspondingly connected to the common voltage signal port 310, the third port 343 of each of the switches 340 is correspondingly connected to the touch scanning signal generating circuit 320, and the fourth port 344 of each of the switches 340 is correspondingly connected to the pressure scanning signal generating circuit 330.

In addition, the controller 350 is configured to apply a control signal to a control port 345 of each of the switches 340, such that the connection between the first port 341 of each of the switches 340 and the second port 342 of the switch 340 is turned on during the displaying period, the connection between the first port 341 of each of the switches 340 and the third port 343 of the switch 340 is turned on during the touch scanning period, and the connection between the first port 341 of each of the switches 340 and the fourth port 344 of the switch 340 is turned on during the pressure detecting period.

In addition, in FIG. 3, the second ends of the touch scanning signal lines 360 in the same touch scanning signal line set are correspondingly connected to the first port 341 of the same switch 340. That is, the touch scanning signal lines 360 in the same touch scanning signal line set are correspondingly connected between a certain touch electrode 370 in the touch electrode array and a certain switch 340.

Since the first ends of the touch scanning signal lines 360 are electrically connected to a certain touch electrode 370 in the touch electrode array, by means of the structure shown in FIG. 3, the touch electrode 370 can receive the common voltage signal provided from the common voltage signal port 310 through the switch 340 during the displaying period, receive the touch scanning signal provided from the touch scanning signal generating circuit 320 during the touch scanning period, and receive the pressure scanning signal provided from the pressure scanning signal generating circuit 330 during the pressure detecting period.

In some embodiments, the pressure scanning signal generating circuit 330 may include a part for receiving the pressure sensing signals. In these embodiments, the touch electrodes 370 may send the collected pressure sensing signal to the pressure scanning signal generating circuit 330 through the switches 340 during the pressure detecting period.

In addition, in some embodiments, the touch scanning signal provided by the touch scanning signal generating circuit 320 and the pressure scanning signal provided by the pressure scanning signal generating circuit 330 may have the same scanning waveform. In these embodiments, the integrated circuit may include only the touch scanning signal generating circuit 320 or the pressure scanning signal generating circuit 330. During the touch scanning period and the pressure detecting period, the controller 350 may control the first port 341 of the switch 340 to connect to the third port 343 or the fourth port 344, so as to obtain the scan signal and receive the pressure sensing signals.

Returning to FIG. 2, the touch display device shown in FIG. 2 further includes a plurality of touch sensing signal line sets.

As shown, each of the touch sensing signal line sets includes at least one touch sensing signal line 250. The touch sensing electrodes 220 is correspondingly connected to a first end of at least one touch sensing signal line 250, and the second ends of the touch sensing signal lines 250 is respectively connected to the integrated circuit 230.

The integrated circuit 230 is further configured to provide a reference voltage signal to the touch sensing electrodes 220 during the displaying period and the pressure detecting period, and to receive touch sensing signals from the touch sensing electrodes 220 during the touch scanning period.

In the embodiment shown in FIG. 2, the first ends of the touch sensing signal lines 250 in the same touch sensing signal line set are correspondingly connected to the same touch sensing electrode 220. In addition, the reference voltage signal provided by the integrated circuit 230 to the touch sensing electrodes 220 is a DC voltage signal.

Figure 4:
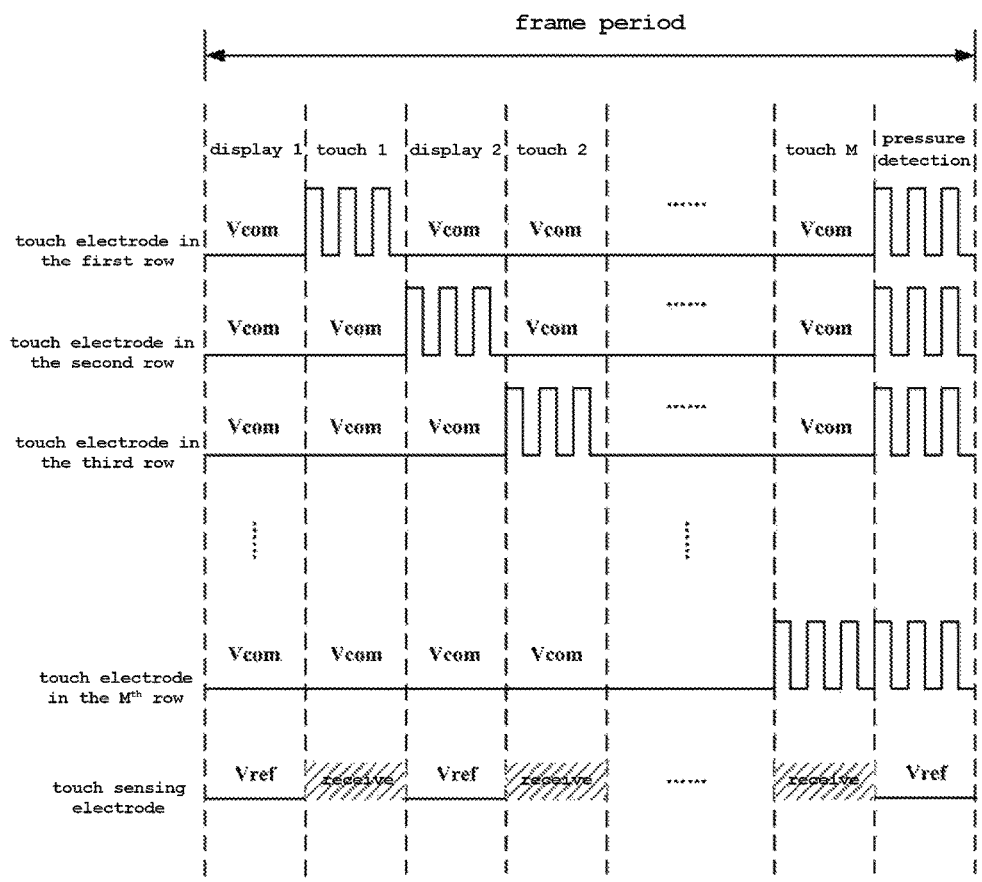
FIG. 4 shows a timing diagram of signals for driving the touch display device shown in FIG. 2.

FIG. 4 illustrates a timing diagram of signals for driving the touch display device shown in FIG. 2.

A timing diagram of signals during one frame period is shown in FIG. 4.

In the embodiment shown in FIG. 4, the frame period may include a displaying period, a touch scanning period, and a pressure detecting period.

The row direction of the touch electrode array (as shown in FIG. 2) is parallel to the first direction.

During one frame period, the displaying period includes M displaying sub-periods, and the touch scanning period includes M touch scanning sub-periods. That is, the number of the displaying sub-periods included during one frame period is the same as the number of rows of the touch electrode array, and the number of the touch scanning sub-periods included during one frame period is also the same as the number of rows of the touch electrode array.

During the pressure detecting period, the integrated circuit provides the pressure scanning signal to all the touch electrodes in the touch electrode array, receives the pressure sensing signals from the touch electrodes, and provides a reference voltage signal Vref to all the touch sensing electrodes.

During the $i^{th}$ displaying sub-period, the integrated circuit provides a common voltage signal Vcom to all the touch electrodes in the touch electrode array, and provides the reference voltage signal Vref to all the touch sensing electrodes.

During the $i^{th}$ touch scanning sub-period, the integrated circuit provides the touch scanning signal to the touch electrode in the $i^{th}$ row, provides the common voltage signal Vcom to the touch electrodes in the other rows in the touch electrode array, and receives the touch sensing signals from all the touch sensing electrodes, wherein i is a natural number, and satisfies: $1 \leq i \leq M$.

Alternatively, during one frame period, any $i^{th}$ displaying sub-period is adjacent to the any $i^{th}$ touch scanning sub-period.

In addition, although FIG. 4 illustrates that the pressure detecting period is at the end of one frame period, it is merely illustrative. With the present disclosure, those skilled in the art may adjust the pressure detecting period at any position of one frame period according to the requirements of the applications in practice.

Figure 5:
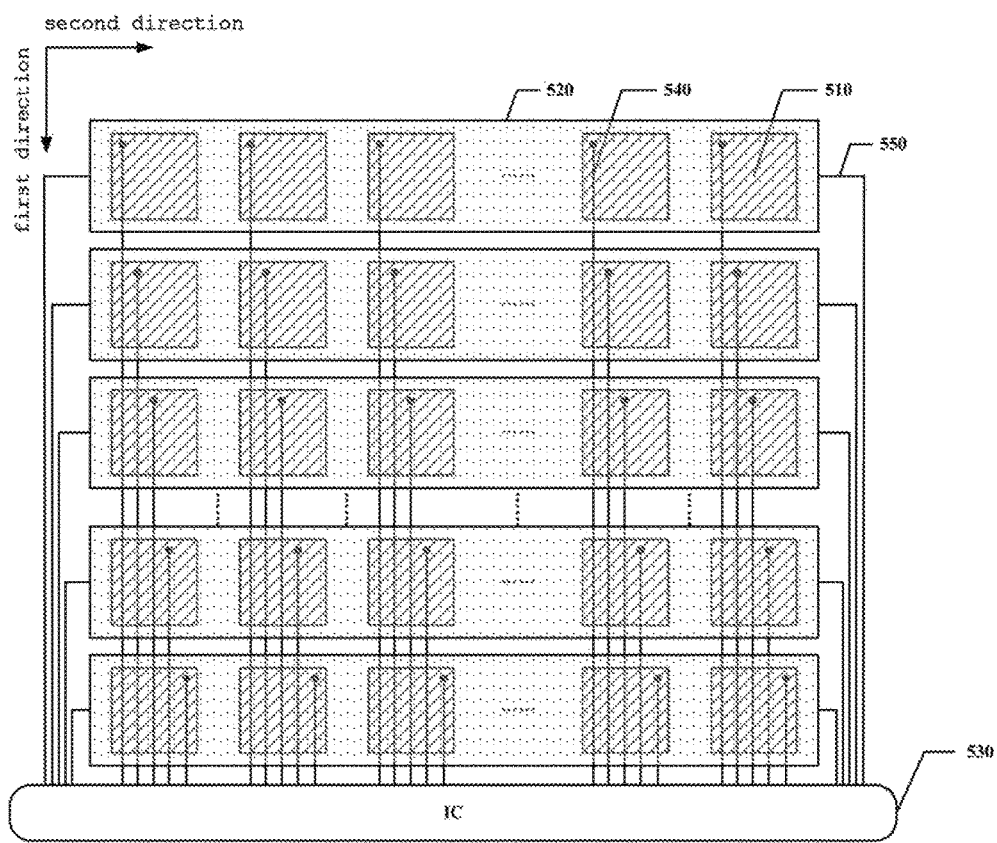
FIG. 5 is a schematic structural view of the touch display device according to another embodiment of the present disclosure.

FIG. 5 illustrates a schematic structure of the touch display device according to another embodiment of the present disclosure.

Similar to the embodiment shown in FIG. 2, the touch display device in this embodiment also includes an array substrate and a color film substrate disposed opposite to the array substrate.

A touch electrode array is disposed on the array substrate. The touch electrode array includes M×N touch electrodes 510. The touch electrodes 510 are insulated from each other. The touch electrodes 510 are configured to provide a common voltage signal during a displaying period, to provide a touch scanning signal during a touch scanning period, and to provide a pressure scanning signal and receive pressure sensing signals during a pressure detecting period.

A plurality of touch sensing electrodes 520 arranged along a first direction are disposed on the color film substrate. The touch sensing electrodes extend along a second direction perpendicular to the first direction. The touch sensing electrodes 520 are insulated from each other and are configured to receive touch sensing signals during the touch scanning period.

The orthographic projection of each of the touch electrodes 510 to the plane where the touch sensing electrodes 520 are located at least partially overlaps with one of the touch sensing electrodes 520.

Different from the embodiment shown in FIG. 2, the row direction of the touch electrode array in this embodiment is parallel to the second direction.

Hereinafter, a timing diagram of signals for driving the touch display device shown in FIG. 5 is described with reference to FIG. 6.

As shown, the frame period may also include a displaying period, a touch scanning period and a pressure detecting period.

During one frame period, the displaying period includes N displaying sub-periods, and the touch scanning period includes N touch scanning sub-periods. That is, the number of the displaying sub-periods included during one frame period is the same as the number of columns of the touch electrode array, and the number of the touch scanning sub-periods included during one frame period is also the same as the number of columns of the touch electrode array.

During the pressure detecting period, the integrated circuit provides the pressure scanning signal to all the touch electrodes in the touch electrode array, receives the pressure sensing signals from the touch electrodes, and provides the reference voltage signal Vref to all the touch sensing electrodes.

During the $j^{th}$ displaying sub-period, the integrated circuit provides the common voltage signal Vcom to all the touch electrodes in the touch electrode array, and provides the reference voltage signal Vref to all the touch sensing electrodes.

During the $j^{th}$ touch scanning sub-period, the integrated circuit provides the touch scanning signal to the touch electrode in the $j^{th}$ column, provides the common voltage signal Vcom to the touch electrodes in the other columns in the touch electrode array, and receives the touch sensing signals from all the touch sensing electrodes, wherein j is a natural number, and satisfies: $1 \leq j \leq N$.

Alternatively, during one frame period, the any $j^{th}$ displaying sub-period is adjacent to the any $j^{th}$ touch scanning sub-period.

Figure 6:
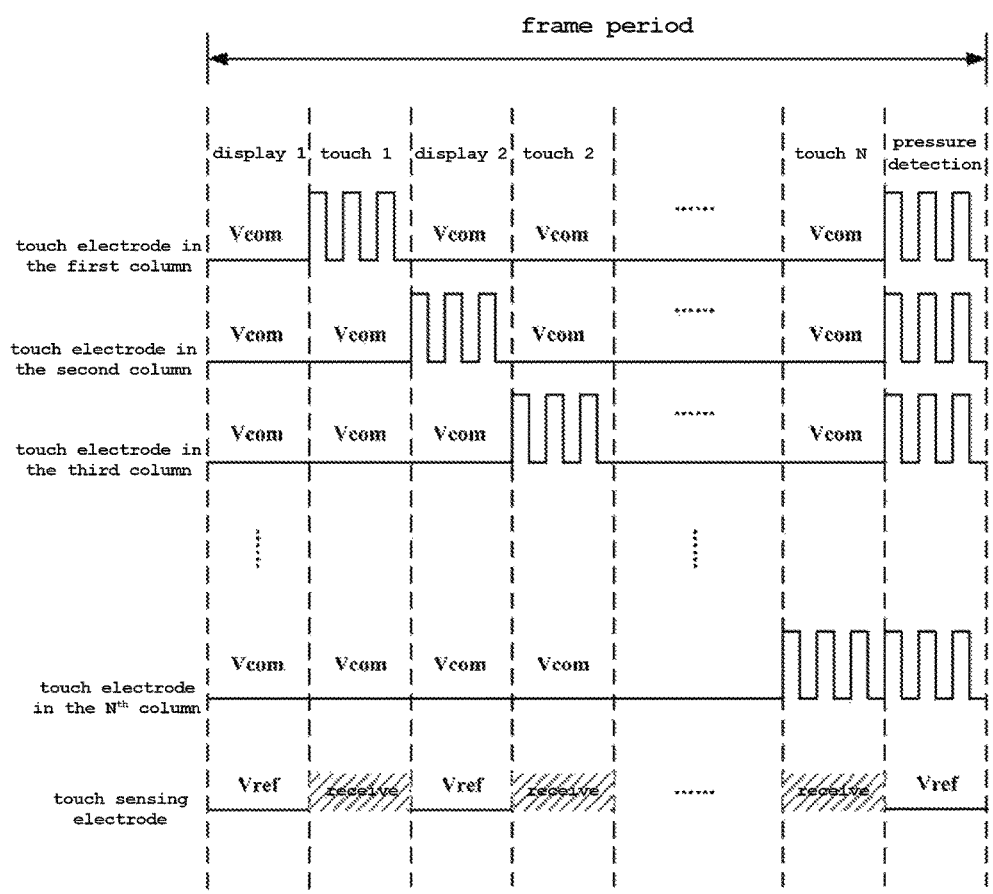
FIG. 6 shows a timing diagram of signals for driving the touch display device shown in FIG. 5.

In addition, although FIG. 6 illustrates that the pressure detecting period is at the end of one frame period, it is merely illustrative. With the present disclosure, those skilled in the art may adjust the pressure detecting period at any position of one frame period according to the requirements of the applications in practice.

Figure 7:
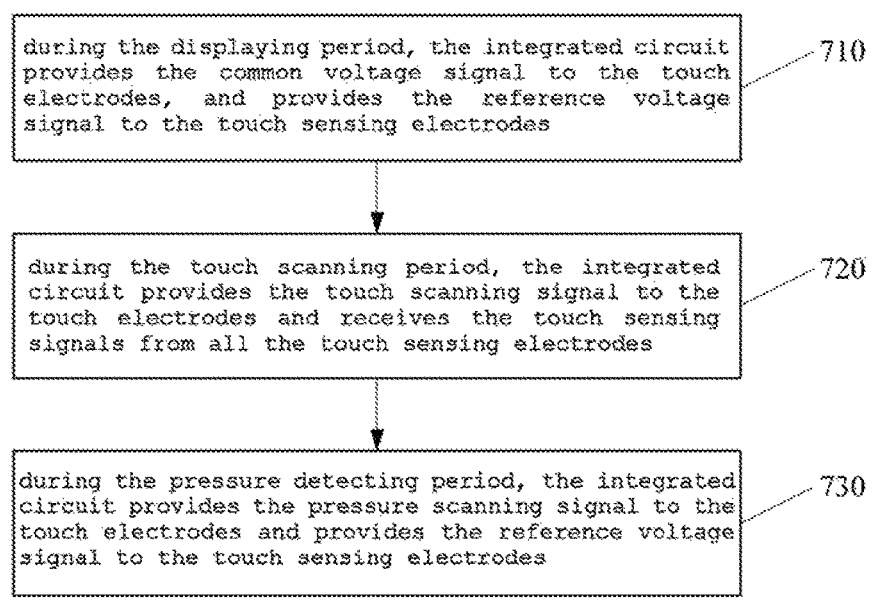
FIG. 7 is a schematic flowchart of a method for driving the touch display device of the present disclosure.

FIG. 7 illustrates a schematic flowchart a method for driving a touch display device of one embodiment of the present disclosure. The method in this embodiment may be used to drive the touch display device in any one of the above embodiments.

Each frame period includes a displaying period, a touch scanning period and a pressure detecting period.

Specifically, the method in this embodiment includes the following steps.

At step 710, during the displaying period, a common voltage signal is provided by the integrated circuit to the touch electrodes, and a reference voltage signal is provided by the integrated circuit to the touch sensing electrodes.

At step 720, during the touch scanning period, a touch scanning signal to the touch electrodes is provided by the integrated circuit, and touch sensing signals are received by the integrated circuit from all the touch sensing electrodes.

At step 730, during the pressure detecting period, a pressure scanning signal to the touch electrodes, and provides a reference voltage signal is provided by the integrated circuit to the touch sensing electrodes.

It should be noted that the step numbers in this embodiment are merely illustrative, and do not represent the sequence of executing the steps in the driving method of this embodiment.

In one alternative implementation of the driving method of this embodiment, the row direction of the touch electrode array is parallel to the first direction. Then, during one frame period, the displaying period may include M displaying sub-periods, and the touch scanning period includes M touch scanning sub-periods. That is, in the alternative implementations, the number of the displaying sub-periods included during one frame period is the same as the number of rows of the touch electrode array, and the number of the touch scanning sub-periods included during one frame period is also the same as the number of rows of the touch electrode array.

In some embodiments, step 710 may further include: during the $i^{th}$ displaying sub-period, the common voltage signal to all the touch electrodes in the touch electrode array, and the reference voltage signal to all the touch sensing electrodes are provided by the integrated circuit.

Moreover, in those embodiments, step 720 may further include: during the $i^{th}$ touch scanning sub-period, the touch scanning signal is provided by the integrated circuit to the touch electrode in the $i^{th}$ row in the touch electrode array, and the common voltage signal is provided by the integrated circuit to the touch electrodes in the other rows in the touch electrode array, wherein i is a natural number, and satisfies: $1 \leq i \leq M$.

Alternatively, during one frame period, the any $i^{th}$ displaying sub-period is adjacent to the any $i^{th}$ touch scanning sub-period.

In some other embodiments, the row direction of the touch electrode array is parallel to the second direction. Then, during one frame period, the displaying period may include N displaying sub-periods, and the touch scanning period includes N touch scanning sub-periods. That is, in the alternative implementations, the number of the displaying sub-periods included during one frame period is the same as the number of columns of the touch electrode array, and the number of the touch scanning sub-periods included during one frame period is also the same as the number of columns of the touch electrode array.

In still some other embodiments, step 710 may further include: during the $j^{th}$ displaying sub-period, the common voltage signal is provided by the integrated circuit to all the touch electrodes in the touch electrode array, and the reference voltage signal is provided by the integrated circuit to all the touch sensing electrodes.

Moreover, in those embodiments, step 720 may further include: during the $j^{th}$ touch scanning sub-period, the touch scanning signal is provided by the integrated circuit to the touch electrode in the $j^{th}$ column in the touch electrode array, and the common voltage signal is provided by the integrated circuit to the touch electrodes in the other columns in the touch electrode array, wherein j is a natural number, and satisfies: $1 \leq j \leq N$.

Alternatively, during one frame period, the any $j^{th}$ displaying sub-period is adjacent to the any $j^{th}$ touch scanning sub-period.

Persons skilled in the art should understand that, the inventive scope involved in the present disclosure is not limited to the technical solutions constituted by specific combinations of the above technical features, but also should cover other technical solutions constituted by any combinations of the above technical features or equivalent features thereof without departing from the inventive concept. For example, the technical solutions constituted by means of the mutual replacement between the above features and the technical feature having similar functions as disclosed in (not limited in) the present disclosure.

What is claimed is:

1. A touch display device, comprising:
   an array substrate and a color film substrate arranged opposite to the array substrate;
   a touch electrode array disposed on the array substrate, the touch electrode array including a M×N matrix of touch electrodes, the touch electrodes being insulated from each other; and
   a plurality of touch sensing electrodes arranged along a first direction and disposed on the color film substrate, each of the touch sensing electrodes extending along a second direction perpendicular to the first direction, each of the touch sensing electrodes being insulated from other touch sensing electrodes; and
   an integrated circuit and a plurality of touch scanning signal line sets, wherein
   an orthographic projection of each of the touch electrodes to a plane where the touch sensing electrodes are located overlaps at least partially with one of the touch sensing electrodes,
   each of the touch scanning signal line sets comprises at least one touch scanning signal line;
   each of the touch electrodes is correspondingly connected to a first end of at least one of the touch scanning signal lines, a second end of each of the touch scanning signal lines is connected to the integrated circuit;
   the integrated circuit is configured to provide the common voltage signal to the touch electrodes during the displaying period, to provide the touch scanning signal to the touch electrodes and provide touch sensing signals to the plurality of touch sensing electrodes during the touch scanning period, and to provide the pressure scanning signal to the touch electrodes and to receive the pressure sensing signals from the touch electrodes during the pressure detecting period;
   the integrated circuit comprises a common voltage signal port, a touch scanning signal generating circuit, a pressure scanning signal generating circuit, a plurality of switches, and a controller for controlling an ON/OFF state of the plurality of switches;
   each of the switches includes a first port, a second port, a third port, a fourth port, and a control port;
   the first port of each of the switches is correspondingly connected to the second end of the respective touch signal line, the second port of each of the switches is correspondingly connected to the common voltage signal port, the third port of each of the switches is correspondingly connected to the touch scanning signal generating circuit, the fourth port of each of the switches is correspondingly connected to the pressure scanning signal generating circuit; and
   the controller is configured to apply a control signal to a control port of each of the switches, such that the connection between the first port of each of the switches and the second port of the switch is turned on during the displaying period, the connection between the first port of each of the switches and the third port of the switch is turned on during the touch scanning period, and the connection between the first port of each of the switches and the fourth port of the switch is turned on during the pressure detecting period.

2. The touch display device according to claim 1, wherein the first ends of the touch scanning signal lines in a same touch scanning signal line set are correspondingly connected to a same one of the touch electrodes.

3. The touch display device according to claim 1, wherein the second ends of the touch scanning signal lines in a same touch scanning signal line set are correspondingly connected to the first port of a same one of the switches.

4. The touch display device according to claim 1, further comprising a plurality of touch sensing signal line sets; wherein
   each of the touch sensing signal line sets comprises at least one touch sensing signal line;
   each of the touch sensing electrodes is correspondingly connected to a first end of the at least one touch sensing signal line, a second end of each of the touch sensing signal lines is correspondingly connected to the integrated circuit; and
   the integrated circuit is configured to provide a reference voltage signal to the touch sensing electrodes during the displaying period and the pressure detecting period, and to receive touch sensing signals from the touch sensing electrodes during the touch scanning period.

5. The touch display device according to claim 4, wherein the first ends of the touch sensing signal lines in a same touch sensing signal line set are correspondingly connected to a same one of the touch sensing electrodes.

6. The touch display device according to claim 1, wherein each frame period comprises the displaying period, the touch scanning period, and the pressure detecting period.

7. The touch display device according to claim 6, wherein a row direction of the touch electrode array is parallel to the first direction;
   during one frame period, the displaying period comprises M displaying sub-periods, and the touch scanning period comprises M touch scanning sub-periods;
   during the pressure detecting period, the integrated circuit provides the pressure scanning signal to all the touch electrodes in the touch electrode array, receives the pressure sensing signal from each of the touch electrodes and provides the reference voltage signal to all the touch sensing electrodes;
   during an $i^{th}$ displaying sub-period, the integrated circuit provides the common voltage signal to all the touch electrodes in the touch electrode array, and provides the reference voltage signal to all the touch sensing electrodes;
   during an $i^{th}$ touch scanning sub-period, the integrated circuit provides the touch scanning signal to the touch electrode in an $i^{th}$ row, provides the common voltage signal to the touch electrodes in the other rows in the touch electrode array, and receives the touch sensing signals from all the touch sensing electrodes; and
   wherein, $1 \leq i \leq M$.

8. The touch display device according to claim 7, wherein during one frame period, an $i^{th}$ displaying sub-period is adjacent to an $i^{th}$ touch scanning sub-period.

9. The touch display device according to claim 6, wherein a row direction of the touch electrode array is parallel to the second direction;

during one frame period, the displaying period comprises N displaying sub-periods, and the touch scanning period comprises N touch scanning sub-periods;

during the pressure detecting period, the integrated circuit provides the pressure scanning signal to all the touch electrodes in the touch electrode array, receives the pressure sensing signal from each of the touch electrodes, and provides the reference voltage signal to all the touch sensing electrodes;

during a $j^{th}$ displaying sub-period, the integrated circuit provides the common voltage signal to all the touch electrodes in the touch electrode array, and provides the reference voltage signal to all the touch sensing electrodes;

during a $j^{th}$ touch scanning sub-period, the integrated circuit provides the touch scanning signal to the touch electrode in a $j^{th}$ column, provides the common voltage signal to the touch electrodes in the other columns in the touch electrode array, and receives the touch sensing signals from all the touch sensing electrodes; and wherein, 1≤j≤N.

10. The touch display device according to claim 9, wherein during one frame period, a $j^{th}$ displaying sub-period is adjacent to a $j^{th}$ touch scanning sub-period.

11. A method for driving a touch display device according to claim 1, wherein each frame period comprises a displaying period, a touch scanning period, and a pressure detecting period, and the method comprises:

during the displaying period, the integrated circuit provides the common voltage signal to the touch electrodes, and provides the reference voltage signal to the touch sensing electrodes;

during the touch scanning period, the integrated circuit provides the touch scanning signal to the touch electrodes and receives the touch sensing signals from all the touch sensing electrodes; and during the pressure detecting period, the integrated circuit provides the pressure scanning signal to the touch electrodes and provides the reference voltage signal to the touch sensing electrodes.

12. The method according to claim 11, wherein a row direction of the touch electrode array is parallel to the first direction;

during one frame period, the displaying period comprises M displaying sub-periods, and the touch scanning period comprises M touch scanning sub-periods;

the step that during the displaying period, the integrated circuit provides the common voltage signal to the touch electrodes, and provides the reference voltage signal to the touch sensing electrodes comprises:

during an $i^{th}$ displaying sub-period, the integrated circuit provides the common voltage signal to all the touch electrodes in the touch electrode array, and provides the reference voltage signal to all the touch sensing electrodes;

the step that during the touch scanning period, the integrated circuit provides the touch scanning signal to the touch electrodes comprises:

during an $i^{th}$ touch scanning sub-period, the integrated circuit provides the touch scanning signal to the touch electrode in an $i^{th}$ row in the touch electrode array and provides the common voltage signal to the touch electrodes in the other rows in the touch electrode array; and wherein, 1≤i≤M.

13. The method according to claim 12, wherein during one frame period, an $i^{th}$ displaying sub-period is adjacent to an $i^{th}$ touch scanning sub-period.

14. The method according to claim 11, wherein a row direction of the touch electrode array is parallel to the second direction;

during one frame period, the displaying period comprises N displaying sub-periods, and the touch scanning period comprises N touch scanning sub-periods;

the step that during the displaying period, the integrated circuit provides the common voltage signal to the touch electrodes, and provides the reference voltage signal to the touch sensing electrodes comprises:

during a $j^{th}$ displaying sub-period, the integrated circuit provides the common voltage signal to all the touch electrodes in the touch electrode array, and provides the reference voltage signal to all the touch sensing electrodes;

the step that during the touch scanning period, the integrated circuit provides the touch scanning signal to the touch electrodes comprises:

during a $j^{th}$ touch scanning sub-period, the integrated circuit provides the touch scanning signal to the touch electrode in a $j^{th}$ column in the touch electrode array, and provides the common voltage signal to the touch electrodes in the other columns in the touch electrode array; and wherein, 1≤j≤N.

15. The method according to claim 14, wherein during one frame period, a $i^{th}$ displaying sub-period is adjacent to a $i^{th}$ touch scanning sub-period.

* * * * *